United States Patent [19]

Homan

[11] 4,264,482

[45] Apr. 28, 1981

[54] OXYGEN-CURABLE MERCAPTO-FUNCTIONAL ORGANIC COMPOUND COMPOSITIONS POSSESSING RAPID SURFACE REACTION AND METHOD OF FORMING HIGHER MOLECULAR WEIGHT PRODUCTS THEREFROM

[75] Inventor: Gary R. Homan, Midland, Mich.

[73] Assignee: Dow Corning Corporation, Midland, Mich.

[21] Appl. No.: 99,256

[22] Filed: Dec. 3, 1979

[51] Int. Cl.$^3$ .............................................. C08L 91/00
[52] U.S. Cl. ............................... 260/18 R; 260/37 R; 260/45.85 R; 525/535; 528/374; 528/375
[58] Field of Search ................ 528/374, 375; 525/535; 260/37 R, 18 R, 45.85 R

[56] References Cited

U.S. PATENT DOCUMENTS

| | | | |
|---|---|---|---|
| 2,466,963 | 4/1949 | Patrick et al. | 260/79.1 |
| 2,964,503 | 12/1960 | Carpenter et al. | 260/79.1 |
| 3,402,155 | 9/1968 | Kutch | 260/79 |

OTHER PUBLICATIONS

Nametkin et al., "Synthesis and Some Properties of Sulfur-Containing Iron Tricarbonyl Complexes", Journal of Organometallic Chemistry, Elsevoir Sequoia S. A., Lausanne, The Netherlands, 149, pp. 355-370, (1978).

*Primary Examiner*—Melvyn I. Marquis
*Attorney, Agent, or Firm*—Richard E. Rakoczy

[57] ABSTRACT

Compositions which are stable in the absence of oxygen are formed by mixing the following substantially in the absence of oxygen (A) 100 parts by weight of at least one mercapto-functional organic compound which contains an average of at least two mercapto groups per molecule;

(B) 0 to 200 parts by weight of at least one filler;

(C) a catalytic amount, preferably from 0.1 to 6 parts by weight, of an iron carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl; and (D) 0.1 to 6 parts by weight of an acid, such as 2-ethylhexanoic acid, which meets a particular set of criteria.

The compositions polymerize or cure to form higher molecular weight products at room temperature upon exposure to oxygen. These compositions are especially useful as coatings because they possess a rapid rate of surface cure. Elastomeric sealant compositions can be prepared which rapidly become tack-free at the surface and are less prone to surface contamination by foreign matter such as dust during cure.

22 Claims, No Drawings

OXYGEN-CURABLE MERCAPTO-FUNCTIONAL ORGANIC COMPOUND COMPOSITIONS POSSESSING RAPID SURFACE REACTION AND METHOD OF FORMING HIGHER MOLECULAR WEIGHT PRODUCTS THEREFROM

BACKGROUND OF THE INVENTION

1. Field of the Invention

This invention relates to compositions including organic compounds containing sulfur and to a method of forming higher molecular weight products from such compositions. This invention also relates to elastomers and resins consisting of organic polymers containing sulfur.

2. Description of the Prior Art

Compositions consisting of mercapto-functional organic compounds which are free of aliphatic unsaturation such as vinyl and are polymerized or cured by means of the mercapto groups are well-known in the art. Many types of curing or condensing agents have been suggested such as inorganic peroxides such as alkali metal and alkaline earth metal peroxides such as sodium peroxide or lead peroxide; inorganic oxidizing agents such as chromate or permanganate salts; organic peroxides such as benzoyl peroxide; organic hydroperoxides such as cumene hydroperoxide and other organic curing agents such as polyepoxides, polyisocyanates, organic borates or organic titanates; and the like, many of which are detailed in U.S. Pat. Nos. 2,466,963 and 2,964,503.

Room temperature polymerization or cure of such compounds, which is believed to be caused by oxidation resulting from exposure to air or oxygen, has been accomplished through the use of inorganic chromates such as sodium chromate, paint driers and heavy metal salts such as lead naphthenate or cobalt 2-ethylhexoate.

Nametkin, et al., in the Journal of Organometallic Chemistry, 149, pp. 355-370 (1978) report that when stoichoimetric amounts of $Fe(CO)_5$, $Fe_2(CO)_9$, or $Fe_3(CO)_{12}$ are reacted with thiols of the general formula RSH, where R is an alkyl or aryl radical, in solution, a complex $\{RSFe(CO)_3\}_2$ and a small amount of the disulfide, RSSR, is produced at room temperature and that $Fe_3(CO)_{12}$ is the most effective catalyst. Thermal decomposition of the complex in n-dodecane solution at 160° C. in the presence of air results in decomposition of the complex to form the disulfide. However, this article does not teach that $Fe(CO)_5$, $Fe_2(CO)_9$ or $Fe_3(CO)_{12}$ will function as a catalyst in non-stoichiometric amounts for the room temperature polymerization or cure of the compositions hereinafter described nor does it suggest that the acids hereinafter described will accelerate the rate of surface polymerization or cure of such compositions.

Gary R. Homan and Chi-long Lee are the applicants named in U.S. patent application Ser. No. 099,282 filed on Dec. 3, 1979 pending entitled "Oxygen-Curable Mercapto-Functional Organic Compound Compositions Catalyzed by Metal Carbonyl Compounds And Method of Forming Higher Molecular Weight Products Therefrom" which is assigned to the same assignee as the present invention. In that patent application, Homan and Lee teach that the use of metal carbonyl compounds, especially those containing iron such as iron pentacarbonyl, in mercapto-functional organic compounds containing an average of at least two mercapto groups per molecule results in compositions which are storage stable in the absence of oxygen. Such compositions polymerize or cure at room temperature upon exposure to oxygen to a thickness of 0.5 millimeters after 24 hours and up to 3 millimeters after several weeks. Such products are useful as coatings, impregnants for porous materials and elastomeric sealants.

Quite unexpectedly, it was discovered that when an acid which satisfies the criteria set out below was included in iron carbonyl catalyzed compositions as taught by Homan and Lee, the composition exhibited a much faster rate of surface polymerization or cure than did compositions without an acid. Such improved compositions are especially useful where thin films are coated on articles such as wire, paper or electronic circuit boards because the rapid cure enables the articles to be handled at an earlier time than compositions which do not contain acid accelerators. Rapid surface cure also reduces the amount of time the surface is tacky and thus vulnerable to contamination by dust or other foreign matter.

DESCRIPTION OF THE INVENTION

This invention relates to a composition of matter, stable in the absence of oxygen, which consists essentially of a product obtained by mixing the following substantially in the absence of oxygen (A) 100 parts by weight of at least one mercapto-functional organic compound which contains an average of at least two mercapto groups per molecule and is free of silicon atoms, aliphatic unsaturation and radicals which are reactive with mercapto groups at room temperature;

(B) 0 to 200 parts by weight of at least one filler;

(C) a catalytic amount of an iron carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl; and (D) 0.1 to 6 parts by weight of an acid which meets the following criteria: (1) it must be compatible with the mixed composition, (2) it must be a proton donor, and (3) the dissociation constant of the acid in an aqueous solution must be greater than $10^{-5}$.

This invention also relates to a method of forming a higher molecular weight product which consists essentially of the steps of (I) mixing at least one mercapto-functional organic compound as defined in (A) above, a catalytic amount of an iron carbonyl compound as defined in (C) above and 0.1 to 6 parts by weight of an acid as defined in (D) above to form a mixture and (II) exposing said mixture to oxygen. This invention also relates to the product obtained by exposing the above composition or mixture to oxygen.

For the purposes of the present application, the following terms will be defined. The term "oxygen" is intended to mean gaseous oxygen which can be in the form of atmospheric or pure oxygen gas. The term "organic compound" is intended to mean organic compounds which do not contain silicon and are free of aliphatic unsaturation and radicals which are reactive with mercapto groups at room temperature such as epoxy and isocyanate. "Organic compound" also includes polymeric compounds. A further distinction will be made by defining a "lower molecular weight compound" to be an organic compound possessing a molecular weight of less than 1000 and also includes dimeric and trimeric compounds. Organic "polymers" are defined as organic compounds possessing a molecular weight of greater than 1000 and containing more than three repeating units per molecule. Because some lower molecular weight compounds can possess more than three repeating units and have a molecular weight under 1000, such compounds will be classified as polymers solely on the basis of the number of repeating units in the molecule. "Mercapto-functional" is intended to mean that each molecule possesses mercapto groups which are —SH groups in the traditional chemical sense.

Catalyzed compositions begin to polymerize or cure upon contact with oxygen. Thus, the containers used to store the catalyzed compositions should be carefully selected to avoid materials which are sufficiently oxygen permeable to appreciably affect storage stability. Techniques for mixing compositions which are oxygen or moisture sensitive are well-known in the art. For example, low-shear mixers can be used for lower viscosity compositions while bread dough mixers can be used for more viscous compositions such as sealant formulations which contain fillers.

This invention has two aspects. One is a novel method of polymerizing or curing mercapto-functional organic compounds to form higher molecular weight products. The other is directed toward the formation of storage-stable compositions. In order to accomplish the first aspect, one merely exposes a mixture of the mercapto-functional organic compound, a particular type of acid and iron carbonyl compound to oxygen. Thus, if storage stability is not required, the mercapto-functional organic compound, acid and iron carbonyl compound can be mixed together, preferably in that order, in the presence of oxygen and immediately allowed to polymerize or cure.

When storage-stable compositions are desired, the ingredients are mixed in the substantial absence of oxygen by any well-known means. The preferred procedure which can be used to maximize storage life involves mixing the organic compounds, acid and filler, if any, under a dry nitrogen atmosphere. The mixture can then be subjected to a vacuum, such as 30 millimeters of mercury, for a short while to remove any trapped oxygen. The catalyst can then be added, preferably as a solution in a suitable solvent or diluent such as toluene or mineral oil. Many of these catalysts are sensitive to oxygen and can react to form inactive species. The presence of oxygen in catalyzed compositions can also result in premature gelation. It is therefore preferable that the mixed compositions be substantially free of oxygen to maximize storage life.

Mercapto-functional organic compounds useful in compositions of the present invention are well-known in the art and can be any organic compounds which contain an average of at least two mercapto groups per molecule, and are free of silicon atoms, aliphatic unsaturation and radicals which are reactive with mercapto groups at room temperature, such as epoxy and isocyanate radicals, which would render stored compositions of the present invention unstable. Such compounds can be of the general formula $Q(SH)_x$ where x has an average value greater than or equal to 2 and Q is a divalent or polyvalent hydrocarbon which can also contain heteroatoms such as halogen, oxygen, nitrogen or sulfur. Such compounds can be monomers, such as 1,2-dimercaptoethane; dimers such as $HSCH_2CH_2SSCH_2CH_2SH$ or $(HSCH_2CH_2)_2O$, and trimers such as $HS(CH_2CH_2OCH_2OCH_2CH_2SS)_2CH_2CH_2OCH_2OCH_2CH_2SH$ and polymers such as $HSCH_2COOCH_2(CH_2OCH_2)_yCH_2OOCCH_2SH$ where the average value of y is greater than 3.

Lower molecular weight mercapto-functional organic compounds can be those which are aliphatic such as 1,2-dimercaptoethane, 1,3-dimercapto-3-methylbutane, 1,6-dimercaptohexane, 1,12-dimercaptododecane or 1,2,3-trimercapto-2-methylbutane; cycloaliphatic such as 1,2,3-trimercaptocyclohexane or 1,2-dimercaptocycloheptane; aromatic such as 1,2-dimercaptobenzene or 3,4-dimercaptotoluene; and alkylaromatic such as alpha,2-dimercaptotoluene. Lower molecular weight mercapto-functional organic compounds containing heteroatoms can be compounds containing oxygen such as ethers such as those of the general formulas $(HSR^1)_2O$ or $HS(C_3H_6O)_2C_3H_6SH$; complete esters such as those of the general formula $(HSR^2COO)_2R^3$, $R^4C(CH_2OOCR^2SH)_3$, $C(CH_2OOCR^2SH)_4$, $(HSR^2COOCH_2)_3CCH_2OCH_2C(CH_2OOCR^2SH)_3$, $\{HSR^2COO(H)C\}\{CH_2OOCR^2SH\}_2$ or $(HSR^2COOCH_2)_3CCH_2OCH_2C(CH_2OOCR^2SH)_2CH_2OCH_2C(CH_2OOCR^2SH)_3$ wherein $R^1$ is alkylene of 2 to 4 inclusive carbon atoms, $R^2$ is alkylene of 1 to 20 inclusive carbon atoms or phenylene, $R^3$ is alkylene of 2 to 6 inclusive carbon atoms and $R^4$ is an alkyl radical of 1 to 2 inclusive carbon atoms; compounds containing nitrogen can be tris(2-mercaptoethyl)amine, $(HSCH_2CH_2)_2NCH_2CH_2N(CH_2CH_2SH)_2$ or 3,5-dimercaptopyridine; compounds containing sulfur can be $HSCH_2CH_2SSCH_2CH_2SH$ or $HS(C_3H_6)S(C_3H_6)SH$; and compounds containing halogen can be compounds such as 1,3-dimercapto-4-chlorobenzene. The mercapto-functional carboxylic acid esters containing three or more mercapto groups per molecule are preferred. Such esters can be used as the sole type of mercapto-functional organic compound in compositions which cure to resinous products or as cross-linking agents when used in combination with the polymers discussed below. Methods for the preparation of the various types of mercapto-functional organic compounds described above are well-known in the art and can be found in treatises such as The Chemistry of the Thiol Group, Part 1, Patai, editor, John Wiley and Sons, N.Y., pp. 163–269 (1974) and in the patent literature such as in U.S. Pat. No. 4,082,790 which are both hereby incorporated by reference for the purpose of teaching the production of compounds useful in the present invention.

Polymers useful in the mixtures of the present invention include organic polymers containing an average of at least two mercapto groups per molecule which do not contain silicon such as alkylene sulfide polymers such as those taught in U.S. Pat. Nos. 2,466,963 and 3,056,841; arylene (amylene) sulfide polymers such as those taught in British Pat. No. 1,056,226; oxyalkylene polymers such as those taught in U.S. Pat. No. 3,258,495; urethane polymers such as those taught in U.S. Pat. No. 3,114,734; British Pat. No. 1,133,365 or Canadian Pat. No. 911,098; organic polymers containing different types of organic polymer segments within the same polymer molecule (for example, where one type of segment contains disulfide linkages and the other contains oxyalkylene linkages) such as those taught in Canadian Pat. No. 783,649; and organic polymers wherein the mercapto group has been added to the polymer by esterifying a mercapto-functional carboxylic acid, such as 3-mercaptopropionic acid, to an organic polymer containing free hydroxyl groups, such as a polyalkylene glycol, to produce a polymer of the general formula (HSGCOO)(R$^3$OR$^3$)$_y$(OOCGSH) where G is alkylene of 1 to 20 inclusive carbon atoms or phenylene, and R$^3$ and y are as defined above. The eight immediately preceding patents dealing with polymers are hereby incorporated by reference to teach the production of silicon-free organic polymers useful in compositions of the present invention.

Compositions useful in the present invention can be prepared from single polymers or mixtures of polymers of the same general chemical class (which differ only in molecular weight) or from mixtures of polymers of different chemical classes such as a mixture of a mercapto-functional polysulfide polymer with a mercapto-functional polyurethane polymer, provided that the polymers are compatible with each other. Likewise, the iron carbonyl compound catalyst should be sufficiently soluble in the composition to result in a satisfactory amount of polymerization or cure without necessitating the use of large amounts of catalyst. Generally, greater than 6 parts by weight of catalyst per 100 parts by weight of mercapto-functional organic compound is excessive. Preferably, the mercapto-functional organic compounds, especially the polymers, are liquid at room temperature. In coating and low consistency elastomeric sealant applications, liquid mercapto-functional organic compounds minimize the need for the use of solvents in the formulation to produce an acceptable viscosity.

Preferred among the polymers useful in compositions of the present invention are polysulfide polymers which are liquid at room temperature, such as those taught by U.S. Pat. No. 2,466,963. Such polymers can be represented by the general formula HS(R$^5$SS)$_z$R$^5$SH where R$^5$ is a divalent hydrocarbon radical, oxyalkylene radical such as (—C$_2$H$_4$OCH$_2$OC$_2$H$_4$—), or thiohydrocarbon radical such as (—C$_2$H$_4$SC$_2$H$_4$—), preferably R$^5$ is selected from the group consisting of divalent oxyalkylene radicals of the general formulas (—R$^1$OCH$_2$OR$^1$—) and (—R$^1$OR$^1$—) where R$^1$ is alkylene of 2 to 4 inclusive carbon atoms; z has an average value of 1 to 50, preferably from 4 to 23; and can also include tri-functional and/or tetra-functional molecules such as {—SSCH(CH$_2$SS—)$_2$} to produce branching in the polymer chain. The preferred polysulfide polymers described above can be described as organic polydisulfidepolymercaptan polymers having a molecular weight of approximately 500 to 12,000 which contain multiply recurring disulfide (—SS—) linkages between carbon atoms, exist as a liquid at 25° C. and contain an average of at least two mercapto groups per molecule.

Several means for obtaining a cured composition with particular properties are available. One means was mentioned above and consists of mixing polymers and/or lower molecular weight compounds containing an average of two mercapto groups per molecule with lower molecular weight organic compounds containing three or more mercapto groups per molecule. Use of lower molecular weight organic compounds containing three or more mercapto groups per molecule increases the cross-link density of the cured polymer. Increases in cross-link density are generally evidenced by changes in the physical properties of the cured product such as an increase in hardness or brittleness. The same result can also be accomplished by incorporating polymers which contain an average of three or more mercapto groups per molecule into such a composition. Products which are hard and highly crosslinked are useful as coatings for articles such as electronic components and circuit boards.

Polymers containing an average of more than two mercapto groups per molecule can be used as the sole type of polymer in a composition to produce a cured product useful as a coating. The cross-link density of the cured products can also be increased by increasing the total number of mercapto groups per polymer molecule. By selecting a polymer with an adequate number of mercapto groups per molecule, a composition can be obtained which cures to a satisfactory hardness without the use of additional cross-linking agents such as lower molecular weight compounds and/or polymers.

Elastomeric sealant formulations generally require a certain degree of ability to elongate without tearing. Thus the use of major amounts (greater than 50% by weight) of organic compounds containing an average of only two mercapto groups per molecule, preferably linear organic compounds, is desirable in such formulations. A sufficient amount of lower molecular weight compounds containing three or more mercapto groups per molecule is generally included to produce a cured elastomer with a tack-free surface.

Organic compounds which contain only two mercapto groups per molecule are only capable of polymerization by chain-extension and generally produce tacky gums unless the organic compound used initially is either sufficiently cross-linked or is high enough in molecular weight to result in a tack-free surface after exposure to oxygen. Such tacky gums could be used as soft protective coatings which are later removed by peeling the coating from the article to be protected or by dissolving the coating with a solvent. Such compositions can also find use as impregnants for porous materials which absorb the composition.

Fillers and pigments may be used with the compositions of this invention, but are not required. Extending fillers can preferably be used in amounts of 10 to 200 parts by weight per 100 parts by weight of mercapto-functional organic compound, especially in elastomeric sealant formulations. Suitable extending fillers can be calcium carbonate, talc, ground or crushed quartz, diatomaceous earth, fibrous fillers such as glass or asbestos and the like. Reinforcing fillers such as fume silica, surface-treated silica, carbon black and the like may also be used. As is well-known in the art, reinforcing fillers cannot be used in as large an amount as extending fillers can be used, thus any formation including such fillers generally would not contain more than 70 parts by weight per 100 parts by weight of the mercapto-functional organic compound and preferably, from 5 to 30 parts. Extending fillers can also be included in formulations containing reinforcing fillers in amounts of up to 200 parts by weight per 100 parts by weight of the mercapto-functional organic compounds less the amount of reinforcing filler present, provided that the capacity of the mercapto-functional organic compounds to accept such amounts of filler is not exceeded. Pigments, such as titanium dioxide or coloring pigments and other additives such as fire-retardant additives, plasticizers and the like are also contemplated as being useful in compositions of the present invention. Routine testing can be used to determine the effect of fillers and additives on the composition and its shelf life.

Iron carbonyl compounds contemplated as being useful as catalysts in the practice of the present invention are Fe(CO)$_5$, Fe$_2$(CO)$_9$, Fe$_3$(CO)$_{12}$, dicyclopentadienyldiiron tetracarbonyl or {(C$_5$H$_5$)Fe(CO)$_2$}$_2$, butadieneiron tricarbonyl or $(C_4H_6)Fe(CO)_3$, and cyclohexadieneiron tricarbonyl or $(C_6H_8)Fe(CO)_3$. The amount of catalyst necessary is not critical. Any catalytic amount can be employed which will adequately polymerize or cure the compositions in the presence of oxygen to result in a product which is satisfactory for the desired end use. Changing the level of catalyst can alter the properties of the product, especially in the elastomeric products. I have found that a range of 0.1 to 6 parts by weight of iron carbonyl compound per 100 parts by weight of mercapto-functional organic compound is usually sufficient. The preferred iron carbonyl compound is iron pentacarbonyl. Iron carbonyl compounds are known to be toxic and somewhat volatile, therefore, care should be exercised when such compounds are handled and adequate ventilation should be provided during the polymerization or cure of these compositions.

As previously noted, the iron carbonyl compounds are affected by oxygen. Thus, to aid in the handling of the compounds and to speed the incorporation of the catalyst into the composition, it is preferable to first dissolve the iron carbonyl compounds in a hydrophobic solvent or diluent such as toluene or mineral oil. Iron carbonyl compounds are well-known in the art and methods for their preparation may be found in the literature, for example, in Organometallic Compounds, Volume I, Dub, editor, Springer-Verlag, N.Y. (1966) and Handbook of Organometallic Compounds, Hagihara, Kumada and Okawara, editors, W. A. Benjamin Co., N.Y. pp. 822–903 (1968) which are both hereby incorporated by reference to teach the production of the above iron carbonyl compounds.

To be useful as a surface-polymerization or surface-cure accelerator, an acid must meet three criteria: (1) it must be compatible with the mixed composition, (2) it must be a proton donor, and (3) the dissociation constant of the acid in aqueous solution must be greater than $10^{-5}$.

For purposes of the present application, the term "compatible" is intended to mean an acid which is sufficiently soluble in the organic compound composition to allow it to become homongeneously incorporated. For example, an acid which is not soluble in the mercapto-functional organic compound composition generally cannot become homogeneously incorporated even when the acid is first dissolved in a solvent which is compatible with both the acid and the mercapto-functional organic compounds present. The acid may initially appear to become homogeneously incorporated, but can later rise to the surface of a stored composition and will not have the desired accelerating effect on the rate of polymerization or cure. Furthermore, lack of solubility can result in a reduced or non-existent accelerating effect even if the acid does not immediately begin to separate from the composition.

The term "compatible" is also intended to mean that the acid is not sufficiently reactive with the composition during storage and/or polymerization or cure to render the composition or cured product unsatisfactory for its intended use.

The term "proton donor" is intended to mean that an acid suitable for use in the present invention must be a proton donor in accordance with the generally accepted Lowry-Bronsted definition, i.e., an acid is a substance which gives up a proton and a base is a substance that accepts a proton. Thus, an acid which gives up a hydrogen ion upon dissociation, such as acetic or sulfuric acid, is a proton donor under this definition and meets the second criterion. Not all Lewis acids, which are defined as electron pair acceptors and include compounds such as boron trifluoride, meet the requirements of the second criterion.

The tendency of an acid to give up a proton is referred to as acid strength and a commonly accepted measure of acid strength is the acidic dissociation constant (usually symbolized by K, $K_A$, or $K_a$) of the acid in an aqueous solution. Such constants have been extensively studied and are readily available in the literature. Polybasic acids which are capable of donating more than one proton per molecule have a separate dissociation constant listed for each proton and for purposes of the present invention, only the dissociation constant of the first proton is used in determining whether the acid meets the third criterion. Acid strength increases as the value of the dissociation constant increases and acids with values of K (for the first proton to dissociate) greater than $10^{-5}$ are required for use in the present invention. For example, the dissociation constant for acetic acid is $K=1.76\times10^{-5}$, as reported in a table in the Handbook of Chemistry and Physics, 50th Edition, Weast, editor, The Chemical Rubber Co., Cleveland, Ohio, p. D-118f. (1969), which table is hereby incorporated by reference to teach various acids which can be used in compositions of the present invention. Since the dissociation constant for acetic acid is greater than $10^{-5}$, acetic acid would satisfy the third criterion.

Both monobasic and polybasic organic and inorganic acids can be used as accelerators if the above three criteria are met. Preferably, carboxylic acids such as acetic, hexanoic, 2-ethylhexanoic and octanoic acid can be used. I have discovered that 2-ethylhexanoic acid is a preferred acid because it is a liquid which is easily incorporated and is much less volatile than acids such as acetic. A unique type of acid accelerator would be carboxylic acids which additionally contain mercapto groups, preferably, those containing two or more mercapto groups, such as 2,3- dimercaptosuccinic acid or $(HSCH_2)_2CHCO_2H$, which would become a part of the polymer structure upon curing. Acids which are solids at room temperature may be added as solutions in solvents which are compatible with both the acids and the mercapto-functional organic compounds. Such acid accelerators are useful in the present invention when added in amounts in the range of 0.1 to 6 parts by weight of acid per 100 parts by weight of mercapto-functional organic compound in the formulation.

Acids satisfying the second and third criteria are easily discovered by reference to tables in the literature and such tables can serve as a guide for selecting acids useful as accelerators. The compatibility of a selected acid with the formulation is a very important criteria and can readily be determined by one skilled in the art through routine testing. For example, storage stability testing can be used to indicate solubility problems which will be evidenced by a loss or absence of accelerated surface cure rate when compared to formulations which do not contain an acid accelerator. Thus, formulations used to coat electrical wires which generate heat during use can be cured and subjected to accelerated heat stability tests to determine if the presence of the acid chosen significantly affects the properties of the cured coatings. If the acid causes an unacceptable amount of deterioration in properties when compared to a formulation containing another type of acid or a formulation without acid accelerator, that acid is not compatible for purposes of the present invention an fails to meet the first criterion. However, the same acid may be compatible when used in a formulation with a different end-use as in a paper coating.

It is believed that compositions of the present invention polymerize or cure to form higher molecular weight products by the formation of disulfide (—SS—) bonds upon exposure to oxygen due to the action of the iron carbonyl catalyst which action is further accelerated at the surface by acids meeting the above three criteria. Once the surface has polymerized or cured, the compositions appear to polymerize or cure at approximately the same rate as the same compositions which do not contain acids. Compositions which do not cure to form tack-free surfaces without the use of an acid generally would not be expected to cure tack-free when an acid is included in the composition. Heating will accelerate the rate of cure in the manner that most chemical reactions are accelerated by a rise in temperature.

Compositions of the present invention are especially useful where compositions are to be cured to thin films such as in electrical insulation and protective coatings. The polymerization or cure reaction only requires the presence of oxygen which is readily available from the atmosphere. Other applications and advantages of the compositions of the present invention will be readily apparent to those skilled in the art.

The following examples are intended as being merely illustrative and are not to be construed as limiting the scope of the present invention, which is properly defined by the appended claims. Unless otherwise indicated, all parts and percentages in the following examples are by weight.

EXAMPLE 1

The preparation and cure of a one-package oxygen-curable composition possessing rapid surface cure was demonstrated by this example. For purposes of comparison, a composition which did not contain acid was also prepared. Twenty grams of dipentaerythritol hexakis(3-mercaptopropionate) was added to each of two low-density polyethylene SemKit ® tubes (commercially available from Semco, Inc., division of Products Research and Chemical Corporation, Glendale, CA.) which are cylinders having the appearance of tubes commonly used for caulking compounds, contain a means for stirring the contents and are designed to be placed in a vacuum to remove volatile materials from compositions placed inside the tube. Additionally, 0.1 gram of 2ethylhexanoic acid was added to the contents of one of the tubes. Because the tubes were filled in the presence of air, the contents of each were de-aired by subjecting it to a vacuum of 30 millimeters of mercury for approximately 15 minutes. A seal was then placed on the back of the tube. Then, 0.5 grams of a 10% solution of iron pentacarbonyl in mineral oil was injected into each sealed SemKit ® tube and the stirrer was used to evenly incorporate the catalyst solution into the contents. A sample of each catalyzed composition was exposed to air at room temperature (22° C.). After 25 minutes, the surface of the composition containing the acid showed signs of surface gelation, but the other composition was essentially unchanged. After one hour, the composition containing the acid had developed a layer of approximately 0.1 millimeters in thickness which was tack-free when touched by a sheet of polyethylene. The other composition first exhibited signs of surface gelation after 90 minutes and the surface layer became tack-free after 3 hours. After 24 hours exposure to air at room temperature, both samples had developed a surface layer of product approximately 0.5 millimeters thick.

Samples of the above catalyzed compositions were stored in sealed SemKit ® tubes for 3 days at room temperature exhibited nearly the same rate of cure as was observed initially. The composition containing acid formed a surface layer 30 minutes after exposure to air at room temperature while the composition without acid required 1.9 hours to develop a surface layer.

EXAMPLE 2

Improved surface cure of a mixture of a lower molecular weight compound and an organic polymer was demonstrated by this comparative example. The polymer used was a commerically-obtained polydisulfidepolymercaptan polymer of the general formula $HS(CH_2CH_2OCH_2OCH_2CH_2)\sim_{23}CH_2CH_2OCH_2OCH_2CH_2 SH$ which contained 1.8% by weight mercapto groups, had a viscosity of 40 Pa·s at 27° C. and reportedly contained approximately 2% of tri-functional molecules to produce branching in the polymer molecules. Two samples were prepared by mixing the ingredients in the presence of air in open metal cans having a volume of 60 milliliters. Sample A consisted of 20 grams of the above polysulfide polymer, 2 grams of dipentaerythritol hexakis(3-mercaptopropionate), 0.2 grams of 2-ethylhexanoic acid and 0.5 grams of iron pentacarbonyl (neat). The 2-ethylhexanoic acid was omitted from the formulation of Sample A to produce a control sample, Sample B. The exposure time was measured from the time the iron pentacarbonyl was added because the lids were not placed on the cans after mixing. The samples were allowed to cure at room temperature (22° C.). Sample A formed a surface skin in 50 minutes while Sample B required 5.5 hours to skin over. Both samples had developed a surface layer approximately 0.4 millimeters thick after 24 hours exposure to air at room temperature.

That which is claimed is:

1. A composition of matter, stable in the absence of oxygen, which consists essentially of a product obtained by mixing the following substantially in the absence of oxygen
    (A) 100 parts by weight of at least one mercapto-functional organic compound which contains an average of at least two mercapto groups per molecule and is free of silicon atoms, aliphatic unsaturation and radicals which are reactive with mercapto groups at room temperature;
    (B) 0 to 200 parts by weight of at least one filler;
    (C) a catalytic amount of an iron carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl; and
    (D) 0.1 to 6 parts by weight of an acid which meets the following criteria: (1) it must be compatible with the mixed composition, (2) it must be a proton donor and (3) the dissociation constant of the acid in an aqueous solution must be greater than $10^{-5}$.

2. The composition as claimed in claim 1 wherein (C) is in the range of 0.1 to 6 parts by weight of iron carbonyl compound per 100 parts by weight of (A).

3. The composition as claimed in claim 2 wherein the iron carbonyl compound is $Fe(CO)_5$.

4. The composition as claimed in claim 3 wherein the acid is 2-ethylhexanoic acid.

5. The composition as claimed in claim 3 or 4 wherein (A) is at least one mercapto-functional organic compound selected from the group consisting of $R^4C(CH_2OOCR^2SH)_3$, $C(CH_2OOCR^2SH)_4$, $(HSR^2COOCH_2)_3(CCH_2OCH_2C)(CH_2OOCR^2SH)_3$, $\{HSR^2COO(H)C\}\{CH_2OOCR^2SH\}_2$ and $(HSR^2COOCH_2)_3CCH_2OCH_2C(CH_2OOCR^2SH)_2CH_2OCH_2C(CH_2OOCR^2SH)_3$ wherein $R^2$ is an alkylene radical of 1 to 20 inclusive carbon atoms or phenylene radical and $R^4$ is an alkyl radical of 1 to 2 inclusive carbon atoms.

6. The composition as claimed in claim 5 having admixed therewith at least one organic polydisulfidepolymercaptan polymer having a molecular weight of approximately 500 to 12,000 which contains multiply recurring disulfide (—SS—) linkages between carbon atoms, exists as a liquid at 25° C. and contains an average of at least two mercapto groups per molecule.

7. A composition which consists essentially of a product formed upon exposure of the composition of claim 3 to oxygen.

8. A composition which consists essentially of a product formed upon exposure of the composition of claim 4 to oxygen.

9. A cured composition which consists essentially of a product formed upon exposure of the composition of claim 5 to oxygen.

10. A cured composition which consists essentially of a product formed upon exposure of the composition of claim 6 to oxygen.

11. A method of forming a higher molecular weight product which consists essentially of the steps of
(I) mixing
   (a) 100 parts by weight of at least one mercapto-functional organic compound, said compound containing an average of at least two mercapto groups per molecule and is free of silicon atoms, aliphatic unsaturation and radicals which are reactive with mercapto groups at room temperature,
   (b) a catalytic amount of an iron carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl and
   (c) 0.1 to 6 parts by weight of an acid which meets the following criteria: (a) it must be compatible with the mixed composition, (b) it must be a proton donor and (c) the dissociation constant of the acid in an aqueous solution must be greater than $10^{-5}$, to form a mixture and
(II) exposing said mixture to oxygen.

12. The method as claimed in claim 11 wherein the amount of iron carbonyl compound present is in the range of 0.1 to 6 parts by weight per 100 parts by weight of (I)(a), the iron carbonyl compound is $Fe(CO)_5$ and the acid is 2-ethylhexanoic acid.

13. The method as claimed in claim 11 wherein the mixture of (I) additionally contains up to 200 parts by weight of at least one filler per 100 parts by weight of (I)(a).

14. A composition which consists essentially of the higher molecular weight product obtained in accordance with the method of claim 11.

15. A composition which consists essentially of the higher molecular weight product obtained in accordance with the method of claim 12.

16. A composition which consists essentially of the higher molecular weight product obtained in accordance with the method of claim 13.

17. The composition as claimed in claim 1 which contains at least one filler.

18. The composition as claimed in claim 2 which contains at least one filler.

19. The composition as claimed in claim 3 which contains at least one filler.

20. The composition as claimed in claim 4 which contains at least one filler.

21. The composition as claimed in claim 7 which contains at least one filler.

22. The composition as claimed in claim 8 which contains at least one filler.

* * * * *

UNITED STATES PATENT AND TRADEMARK OFFICE
CERTIFICATE OF CORRECTION

PATENT NO. : U.S. Pat. 4,264,482
DATED : April 28, 1981
INVENTOR(S) : Gary R. Homan It is certified that error appears in the above-identified patent and that said Letters Patent are hereby corrected as shown below:

In column 1, line 58, the word "pending" should be deleted.

In column 6, line 48, the word "formation" should read --formulation--.

In column 7, line 59, the word --after-- should follow the words "and/or".

In column 9, line 1, the word "an" should read --and--.

In column 9, line 4, the word --such-- should follow the word "end-use".

In column 9, line 50, the word "2ethylhexanoic" should read --2-ethylhexanoic--.

In column 10, line 56, the formula "$Fe_2(CO)_9$" should read --$Fe_2(CO)_9$--.

Signed and Sealed this

Twenty-seventh Day of April 1982

[SEAL]

Attest:

GERALD J. MOSSINGHOFF

Attesting Officer

Commissioner of Patents and Trademarks